Nov. 14, 1967     L. W. BONNELL     3,352,261
COMBINATION AGRICULTURAL MACHINE
Filed March 9, 1965     2 Sheets-Sheet 1
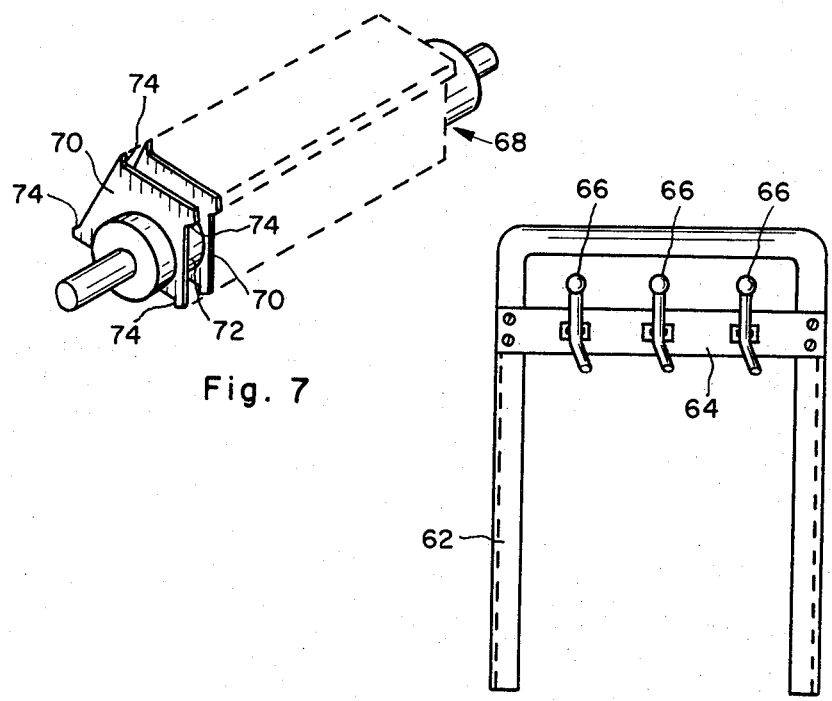
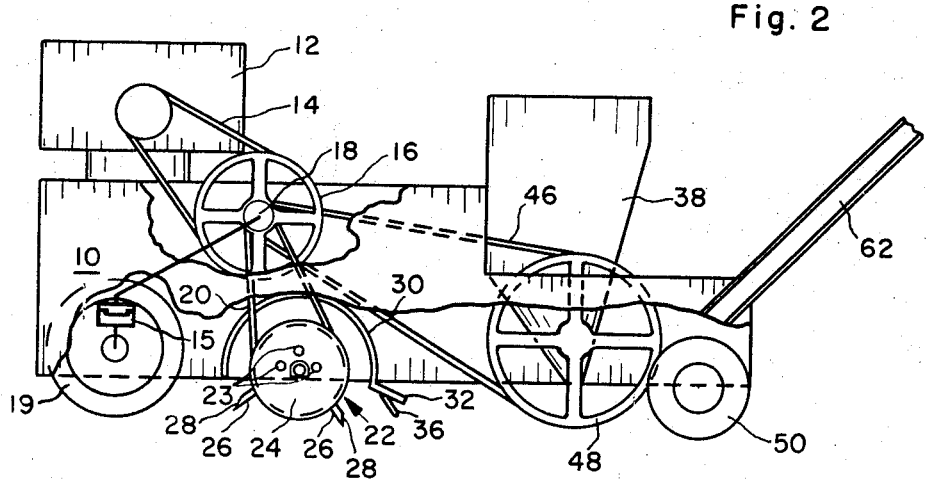
INVENTOR.
LARRY W. BONNELL
BY Alfred E. Miller
ATTORNEY Nov. 14, 1967  L. W. BONNELL  3,352,261
COMBINATION AGRICULTURAL MACHINE
Filed March 9, 1965  2 Sheets-Sheet 2

INVENTOR.
LARRY W. BONNELL
BY Alfred E. Miller
ATTORNEY

United States Patent Office 3,352,261
Patented Nov. 14, 1967

3,352,261
COMBINATION AGRICULTURAL MACHINE
Larry W. Bonnell, 432 Midland Ave., Rye, N.Y. 10580
Filed Mar. 9, 1965, Ser. 438,296
4 Claims. (Cl. 111—8)

ABSTRACT OF THE DISCLOSURE

An agricultural machine for preparing new lawns which includes a rotary rasp that excavates the top layer of the earth, a rake for providing furrows, a power hopper for dispensing both fertilizer and seed in the furrows, and a compacting roller. The compacting roller services the double function of an earth compacting device and a handling device.

The present invention relates to a combination agricultural, machine and more particularly to a compact agricultural machine for landscape maintainers and homeowners whereby several operations may be performed on the earth by a single device.

An object of the present invention is the provision of a self-propelled agricultural machine including a rotating rasping device which is adapted to turn over the soil surface of a lawn, and is provided with a device for making parallel furrows in the overturned earth for seeding and fertilizing purposes.

Another object of the present invention is to provide a combination agricultural machine in which the rotating rasp unit may be easily and quickly exchanged for another unit such as a thatching device.

A further object of the present invention is the provision of a pivoting roller which may be adjusted to various positions in order to result in ease of handling the machine.

Another object of the present invention is to provide a power hopper for dispensing seed and/or fertilizer which may be disconnected at will from the power train of the agricultural machine.

A further object of the present invention is to provide a combination agricultural machine which is relatively inexpensive to construct and can be operated by a single operator with special means for ease of loading the machine on and off a transporting truck.

Another object of the present invention is to provide a main drive shaft with power take-off devices thereon that can be selectively operated to drive the various units of the machine.

The above and other features, objects and advantages of the present invention will be fully understood from the following description considered in connection with the accompanying illustrative drawings.

FIG. 1 is a side elevation view of the combination agricultural machine constructed in accordance with the teachings of the present invention and having parts thereof broken away for purposes of clarity.

FIG. 2 is a front elevation of the power control handle of the combination agricultural machine shown in FIG. 1.

FIG. 6 is a perspective view of the pivoting roller assembly for the present combination agricultural machine and FIG. 7 is a perspective view of a rotary thatching device which may be substituted for the roto-rasp unit in the present combination agricultural machine.

Figure 3:
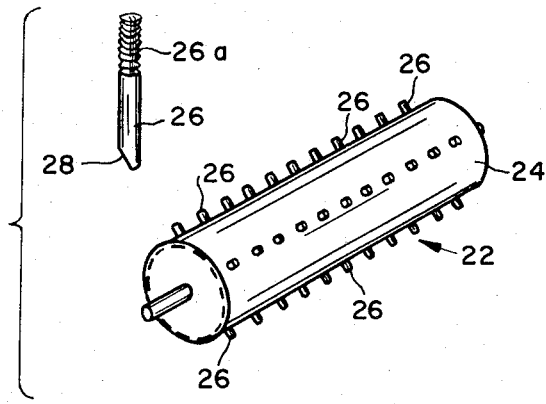
FIG. 3 is a perspective view of the roto-rasp unit together with enlarged view of a representative bolt utilized therein.

Referring more particularly to the drawings and especially to FIGS. 1–6, the present combination agricultural machine constructed in accordance with the teachings of the present invention comprises a chassis 10 in the general form of a rectangle and provided with a motor 12 having a belt drive arrangement 14 which rotates pulley 16 located on main drive shaft 18. The main drive shaft 18 is positioned at right angles to the longitudinal axis of the chassis 10 and provides the power take-off for all the units operating in the present combination agricultural machine. A power take-off means (not shown) couples the main drive shaft 18 to the drive wheels 19 through driving connection 21 and clutch 15. This arrangement is well known in the art and requires no further explanation. A chain 20 operated from main drive shaft 18 rotates the roto-rasp unit 22 which is readily removable from chassis 10 by loosening bolts 23 on both sides of the chassis 10. The bolts 23 are screw-connected into tapped holes (not shown) in the chassis 10. The roto-rasp 22 is then dropped out of the chassis and its appearance when separated from the machine is illustrated in FIG. 3. The thatching unit 68 shown in FIG. 7 may replace the roto-rasp 22 if desired. The roto-rasp of FIG. 3 discloses a cylindrical body 24 preferably of steel pipe having four staggered rows of bolts 26. Each bolt 26 has a threaded portion 26a which is screw threaded into tapped holes in the cylindrical body 24. In addition, the tip of each bolt 26 has an angled end 28 to provide better abrasion or turning over of the ground surface. It should be noted that if any of the individual bolts are bent or broken they can be replaced with new bolts easily and rapidly. The exposed parts of the bolt 26 are preferably from ⅜ of an inch to 1¼ inches in length. This arrangement permits olny the top layer of ground to be overturned and does not disturb the undersurface of the ground as in the case of a cultivator.

Figure 4:
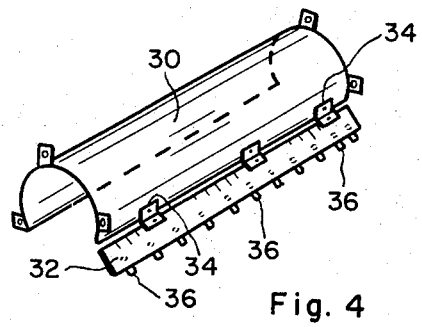
FIG. 4 is a perspective view of the guard and rake combination which is used with the roto-rasp of FIG. 3.

As seen in FIGS. 1 and 4, the roto-rasp 22 has a semicircular guard plate 30 which is located above and adjacent to the roto-rasp, and is affixed to the chassis 10. A rake 32 is hinged at 34 to the guard plate 30 and is provided with a row of spikes 36, each preferably of ¼ inch to one inch in length and spaced about ½ inch apart. The spikes 36 are secured at an angle to the rake 32. The spikes of the rake are adapted to make parallel furrows in the ground overturned by the roto-rasp 22 and the spikes are at an angle relative to rake 32 so that they will not readily become clogged with the dirt loosened by the rotating roto-rasp 22.

Figure 5:
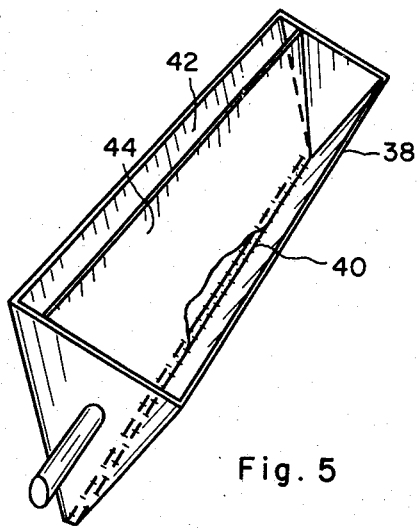
FIG. 5 is a perspective view of the double hopper for seed and fertilizer dispensing.
Figure 6:
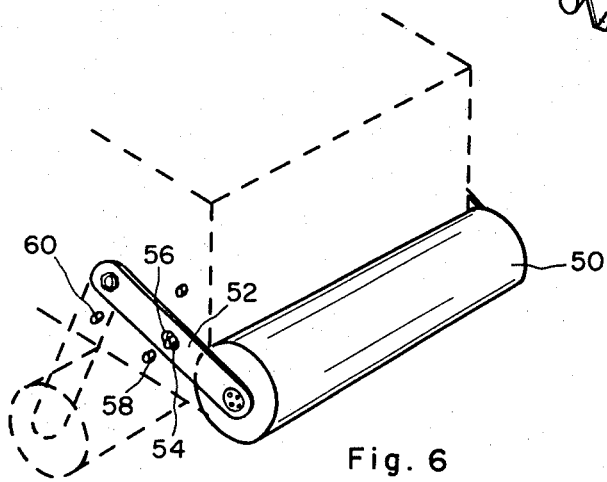

Mounted in the rear of the chassis is a power hopper 38 illustrated in both FIGS. 1 and 5. As seen in FIG. 5, the power hopper 38 is provided with the usual rotating, rod-like dispenser 40 and has a small compartment 42 for seed and a large compartment 44 for fertilizer. Thus, both seed and fertilizers may be dispensed by the power hopper 38. The latter is driven from main drive shaft 18 through a belt 46 and a pulley 48. Also located in the rear of chassis 10 is a pivotable roller 50 as seen in FIGS. 1 and 6. The roller 50 is mounted on arms 52 (only one of which is shown) and may be secured to several locations on the chassis 10 by means of a pin 54 inserted in any one of the selected holes 56, 58 and 60 respectively. When the roller 50 is moved to the dotted line position illustrated in FIG. 6, the back of the machine is elevated to a position which permits easy loading and unloading of the machine from a truck or other transporting vehicle.

A handle 62 is secured to the rear of the chassis 10 and is generally of a U-shaped configuration and is provided with a mounting plate 64 with a series of controls 66 thereon. The controls 66 are used to operate and make inoperative the motor drive and the hopper device of the machine.

The rotatable thatching unit 68 of FIG. 7 may replace the roto-rasp unit 22 by merely removing bolts 23 and inserting the thatching unit in the chassis frame. The thatching unit 68 is provided with a series of multi-thin blades 70 separated by spacers 72. Each blade is provided with a number of knife edges 74. When the unit 68 revolves the knife edges of the blades make parallel cuts into the earth.

It should be apparent that the present combination agricultural machine permits the operator to till, seed, fertilize and roll, all in one operation. This is accomplished as follows: The roto-rasp turns over the sufrace earth, the rake with spikes thereon form a series of parallel furrows into which the power hopper dispenses the present amounts of fertilizer and seed, and finally the roller rolls and compacts the earth back over the dispersed fertilizer and seed in order to complete the operation. If desired, the thatching unit may replace the roto-rasp unit. It should be further noted that the staggered rows of bolts 26 on the roto-rasp 22 results in the complete turning-over of the soil close to the surface of the ground for effective ground preparation and treatment.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A combination agricultural machine comprising a chassis, a motor mounted on said chassis, a main drive shaft mounted on said chassis and operatively connected to said motor, drive wheels in operative connection with said main drive shaft, clutch means for disconnecting the driving connection between said motor and drive wheels, a rotary rasp device provided with separate driving means connected to said main drive shaft, said rotary rasp having a plurality of projections thereon, each of said projections excavating no more than 1¼ inches into the earth's surface, a power hopper located on said chassis, separate driving means connecting said power hopper to said main drive shaft, a roller, and a pair of arms each secured at one end to said chassis and at the other end to said roller, and means on said chassis and removably connected to said arms for permitting said roller to be adjusted to various selected positions relative to said chassis whereby in at least one of said selected positions said roller is located directly under said chassis causing one end of said chassis to be elevated and in another selected position of said roller the latter acts as an earth compacting roller.

2. A combination agricultural machine as set forth in claim 1 wherein said rotary rasp device comprises a cylinder rotatably mounted on said machine, and said projections are a plurality of rows of bolts having angled end surfaces and being removably attached to said cylinder, each of said rows of bolts being staggered relative to the adjacent rows of bolts.

3. A combination agricultural machine as set forth in claim 1 further comprising a rake adjacent to and behind said rotary rasp having a hinged guard plate provided with at least one row of spikes for making rows of furrows in the earth overturned by said rotary rasp.

4. A combination agricultural machine as set forth in claim 3 wherein said hopper dispenses granules into said furrows, and said roller smooths out said furrows and at least substantially covers said granules therein.

References Cited

UNITED STATES PATENTS

| 707,475 | 8/1902 | Whelan | 172—39 |
| 722,287 | 3/1903 | Davis | 172—68 |
| 1,662,088 | 3/1928 | Raussendorff | 172—112 |
| 2,847,924 | 8/1958 | Quick | 172—555 |
| 2,902,098 | 9/1959 | Grunder | 172—43 |
| 3,140,677 | 7/1964 | Fraser | 172—42 |

ABRAHAM G. STONE, *Primary Examiner.*

R. CARTER, A. E. KOPECKI, *Assistant Examiners.*